May 15, 1923.

U. S. DE MOULIN

INITIATION DEVICE

Filed Oct. 30, 1922

1,455,113

U. S. DeMoulin, Inventor

By *[signature]*
Attorneys

Patented May 15, 1923.

1,455,113

UNITED STATES PATENT OFFICE.

ULYSSES S. DE MOULIN, OF GREENVILLE, ILLINOIS.

INITIATION DEVICE.

Application filed October 30, 1922. Serial No. 597,889.

*To all whom it may concern:*

Be it known that I, ULYSSES S. DE MOULIN, a citizen of the United States, residing at Greenville, in the county of Bond and State of Illinois, have invented a new and useful Initiation Device, of which the following is a specification.

This invention relates to initiation devices and more particularly to vehicles the bodies of which simulate animals.

One of the objects of the invention is to provide the body or saddle portion of the vehicle with a movable support of novel construction whereby the said saddle portion or body can be given a tilting motion in any direction so as to render it exceedingly difficult for the rider to maintain his position on the saddle portion or body.

A further object is to so construct the supporting or running gear that the operator is relieved of much of the strain to which he would otherwise be subjected.

With the foregoing and other objects in view which will appear as the description proceeds, the invention resides in the combination and arrangemeont of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
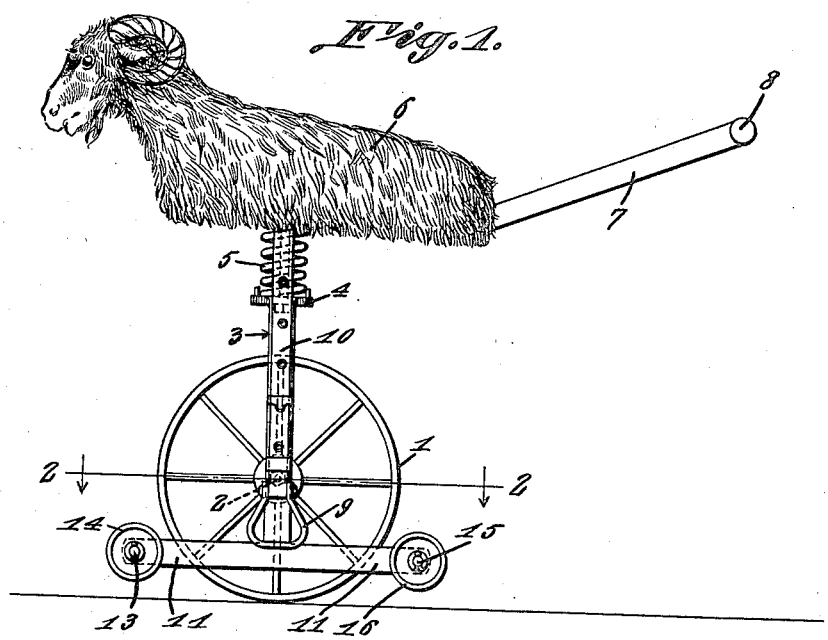
Figure 1 is a side elevation of the device.
Figure 2:
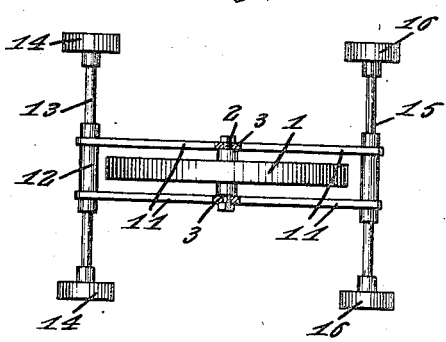
Figure 2 is a section on line 2—2, Figure 1.
Figure 3:
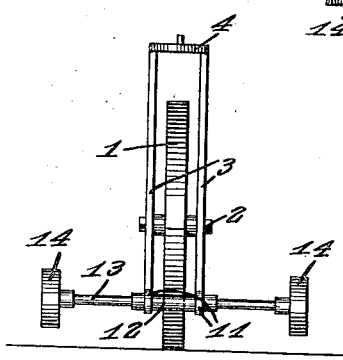
Figure 3 is an end eelvation of the running gear of the device.

Referring to the figures by characters of reference 1 designates a supporting wheel the axle 2 of which is journaled in standards 3 suitably connected at their upper ends as shown at 4 in Figure 3. A spring 5 is suitably secured upon the connection 4 and constitutes a yielding support for a saddle or body portion 6 which, in the structure shown in Figure 1 simulates the body of a goat. A handle bar 7 is extended from one end of this body and has a grip 8 thereon so that the person pushing the device can obtain a strong grasp thereon. Stirrups 9 may be connected to the sides of the saddle or body 6 by means of straps 10 so that the rider can place his feet readily within the stirrups.

The standards 3 extend below the axle 2 and are provided, at their lower ends, with arms 11 extending forwardly and rearwardly therefrom. The front arms are connected by a sleeve 12 in which is mounted the axle 13 of rollers 14 and the rear arms 11 are similarly connected and carry an axle 15 having rollers 16 at its ends. The rollers 14 and 16 are supported considerable distances beyond the outer sides of the arms and serve to limit the forward, backward and lateral tilting of the structure about the point of contact between the supporting wheel 1 and the surface on which it is mounted.

In using this device a candidate is placed on the body or saddle portion 6 while the same is held balanced on the wheel 1 by the operator grasping the grip 8. As the device is moved forwardly it can be caused to tilt in any direction, thus making it difficult for the rider to maintain his position. The tilting movement will be limited by the rollers 14 and 16 coming into contact with the floor, these rollers serving to prevent the device from turning over. By providing the spring support 5 a bouncing action will be produced during the tilting of the body portion 6, thus rendering it even more difficult to ride the device.

Although only one wheel 1 has been illustrated it is to be understood that under some conditions more than one wheel might be desirable. The spring 5 could be dispensed with and instead of the rollers 14 the ends of the axles 11 or some similar structures could be used for limiting the tilting of the device. While the device described is designed primarily for initiation purposes it can also be used as a children's toy or vehicle.

What is claimed is:—

1. An initiation device including a supporting wheel, a structure carried thereby, a body or saddle portion mounted on the structure, a handle bar connected to said body, and means carried by the structure for limiting the tilting movement of the structure in any direction.

2. An initiation device including a supporting wheel, a structure carried thereby, a body or saddle portion mounted on the structure, spaced means carried by the structure for contacting with the surface on which the wheel is mounted to limit the tilting of the structure on said surface in any direction, and a handle bar connected to the body.

3. An initiation device including a supporting wheel, standards at the sides thereof and supported thereby, a body or saddle portion supported by the standards, and means connected to the structure and spaced apart laterally and longitudinally for limiting the tilting movement of the structure in any direction by coming into contact with the surface on which the wheel is mounted.

4. An initiation device including a supporting wheel, connected standards supported by the wheel, a body or saddle portion, a resilient connection between said body and the standard and constituting a support for the body, forwardly and rearwardly extending arms at the lower ends of the standards and below the axis of the wheel, means on the arms for limiting the tilting of the structure in any direction by coming into contact with the surface on which the structure is mounted, and a handle bar for manipulating the structure.

In testimony that I claim the foregoing as my own, I have hereto affixed my signature in the presence of two witnesses.

ULYSSES S. DE MOULIN.

Witnesses:
 H. C. DIEHL,
 J. MCGOWAN.